(12) United States Patent
Penttinen et al.

(10) Patent No.: US 8,178,180 B2
(45) Date of Patent: May 15, 2012

(54) POLYMER-COATED HEAT-SEALABLE PACKAGING MATERIAL AND A SEALED PACKAGE MANUFACTURED THEREOF

(75) Inventors: Tapani Penttinen, Huutjärvi (FI); Kimmo Nevalainen, Kotka (FI)

(73) Assignee: Stora Enso Oyj, Helsinki (FI)

( * ) Notice: Subject to any disclaimer, the term of this patent is extended or adjusted under 35 U.S.C. 154(b) by 320 days.

(21) Appl. No.: 12/375,362

(22) PCT Filed: Jul. 26, 2007

(86) PCT No.: PCT/FI2007/000195
§ 371 (c)(1),
(2), (4) Date: Apr. 10, 2009

(87) PCT Pub. No.: WO2008/012397
PCT Pub. Date: Jan. 31, 2008

(65) Prior Publication Data
US 2009/0324861 A1   Dec. 31, 2009

(30) Foreign Application Priority Data

Jul. 27, 2006   (FI) ..................................... 20060701

(51) Int. Cl.
*B29D 22/00* (2006.01)
*B29D 23/00* (2006.01)
*B32B 1/08* (2006.01)

(52) U.S. Cl. ..................... 428/36.6; 428/36.7; 428/35.7; 428/35.4; 428/36.4; 428/349; 428/516; 428/518; 206/484; 53/484

(58) Field of Classification Search ................. 428/35.7, 428/36.6, 36.7, 35.4, 349, 516, 518, 36.4; 206/484; 53/484
See application file for complete search history.

(56) References Cited

U.S. PATENT DOCUMENTS

| 4,239,826 A | 12/1980 | Knott et al. |
| 4,701,360 A | 10/1987 | Gibbons et al. |
| 4,894,267 A | 1/1990 | Bettle et al. |
| 4,977,004 A | 12/1990 | Bettle, III et al. |
| 5,061,534 A | 10/1991 | Blemberg et al. |
| 5,093,164 A | 3/1992 | Bauer et al. |
| 6,037,063 A | 3/2000 | Muschiatti et al. |

(Continued)

FOREIGN PATENT DOCUMENTS
EP   0630745 A1   12/1994
(Continued)

OTHER PUBLICATIONS

Search Report dated Mar. 17, 2011 of corresponding European Application 07 80 3686.

*Primary Examiner* — Michael C Miggins
(74) *Attorney, Agent, or Firm* — Birch, Stewart, Kolasch & Birch, LLP

(57) ABSTRACT

The invention relates to a heat-sealable packaging material and a sealed package formed from the same, especially for packaging foodstuffs. The packaging material comprises a base layer of paper or board and polymeric heat-sealable layers on one side of the base layer or, preferably, on both sides thereof. According to the invention, at least two layers of ethylene vinyl alcohol copolymer (EVOH) with different fractions of ethylene monomer are arranged on the packaging material to provide an oxygen barrier. The layers can locate against each other without a tie layer between them. The heat-sealable polymer can be a polyolefin, and, in addition, other polymeric barrier layers can be incorporated into the material to improve its oxygen, fat and aroma tightness.

11 Claims, 5 Drawing Sheets

U.S. PATENT DOCUMENTS

| | | |
|---|---|---|
| 2003/0180487 A1 | 9/2003 | Reighard et al. |
| 2004/0005389 A1 | 1/2004 | Reighard et al. |
| 2004/0037983 A1 | 2/2004 | Reighard et al. |

FOREIGN PATENT DOCUMENTS

| | | |
|---|---|---|
| EP | 0857103 B1 | 8/1998 |
| FI | 117622 B | 1/2003 |
| WO | WO-2004/007195 A1 | 1/2004 |

POLYMER-COATED HEAT-SEALABLE PACKAGING MATERIAL AND A SEALED PACKAGE MANUFACTURED THEREOF

The invention relates to the field of polymer-coated heat-sealable packaging materials, wherein the structure comprises a layer that forms an oxygen barrier. Another object of the invention is a sealed package formed from such packaging material by heat sealing. The invention further relates to the use of ethylene vinyl alcohol copolymer (EVOH) in a fibre-based packaging material in the polymer layer that forms the oxygen barrier.

Providing the fibre-based packaging material with a polymer coating layer that softens or melts under the effect of heat enables the use of the material in packages, such as package containers and cartons, which are sealed by heat sealing. The package can also be rendered liquid-tight by means of the heat-sealable polymer coating. Depending on the product, food packages, in particular, are also required to protect the product against light and be oxygen-tight and aroma-tight, which is achieved by means of suitably selected coating materials that are layered on the fibre base.

In conventional procedures, the fibre-based packaging material has been provided with an aluminium foil, rendering the package liquid-tight, oxygen-tight, and aroma-tight and also providing an effective protection against the penetration of visible light and UV radiation. However, as the aluminium foil is non-biodegradable, is exposed to mechanical stress, complicates the recycling of the material and is also an expensive solution, it has increasingly been replaced by polymer coating materials, of which the most important are ethylene vinyl alcohol copolymer (EVOH), polyamide (PA), and polyethylene terephthalate (PET). By combining these polymers with binders and heat-sealable polymers, multi-layer boards have been achieved, having liquid, oxygen and aroma barrier properties almost comparable to those of aluminium, and at the same time even better resistance to impacts, damages and moulding than that of aluminum foil.

With developments towards increasingly thinner packaging materials, while the aluminum foil has been replaced with polymer coating layers, there is a disadvantage of an increasing permeability of oxygen and other gases of the packaging material. Exposure of packaged products to the oxygen in the air, e.g., oxidation of foodstuffs, decreases their preservability and dilutes quality.

As an example of polymer-coated food packaging boards according to the prior art, patent specification EP 0630745 could be mentioned. This specification discloses boards with a fibre base that is provided with a heat-sealable polymer coating on both sides thereof, its material being, e.g., low density polyethylene LDPE or linear low density polyethylene LLDPE, and having an EVOH or PET barrier layer placed between the fibre base and the heat-sealable layer.

For packing orange juice, in particular, the prior art presents various layer solutions without the aluminium foil. U.S. Pat. No. 4,977,004 describes a structure comprising two layers of EVOH. The first layer prevents the penetration of external oxygen into the product. The second EVOH layer comprises the innermost layer of the package in contact with the packed product, in this case, orange juice, and works as a solvent barrier that prevents the flavour components of the product from escaping into the package. As suitable oxygen barrier materials, the specification suggests EVOH grades containing 44 or 32 mol % of polyethylene, or a mixture thereof. However, the EVOH layers presented in the specification are always of the same grade and separated from each other by at least an adhesive layer.

Inspired by the same application, patent specification EP 0857103 B1 describes a sandwich structure with one EVOH layer. The thickness of this layer is 0.8 to 8.1 $g/m^2$ and it uses EVOH with an ethylene content of 27 to 32 mol %, its oxygen barrier being better than that of a reference layer containing 44 mol % ethylene, according to the specification. The EVOH layer described in this specification is tied to the surrounding layers by tie layers on both sides thereof.

A sandwich structure developed to improve the oxygen barrier properties of the package is also disclosed in U.S. Pat. No. 5,093,164, wherein an effective layer is provided between a sealing layer made of a mixture of polypropylene and polyethylene and a substrate layer. In one example, used in a structure containing paper, an EVOH of 3 µmol % that works as the oxygen barrier is surrounded by a tie layer on both sides thereof.

Thus, several specifications report that these EVOH layers with a lower polyethylene content provide lower oxygen permeability values. However, as the properties of the oxygen barrier weaken critically, when the layer is exposed to moisture, this EVOH layer with an ethylene content of 27 to 32 mol % must also be protected against wetting. In prior art, this moisture proofing is typically provided by adding other, preferably moisture barrier polymers, as additional layers and using tie layers to join them to both sides of the oxygen barrier layer. This increases the total number of layers, which, in turn, increases the processing and raw material costs.

The purpose of the present invention is to find a solution that avoids the problem mentioned above. The idea of the invention is thus to optimally utilize the excellent oxygen barrier properties of the ethylene vinyl alcohol copolymer with a low ethylene content of 32 mol % at the most, without the product suffering from the disadvantages of the weak moisture resistance of this material. Surprisingly, it has now been observed that the oxygen permeability of the oxygen barrier that is formed from the EVOH layers that contain various shares of ethylene monomer is quite low, but it is not sensitive to moisture. The interaction between said layers is particularly advantageous. However, the interface that is formed between these EVOH layers has a more important role in the effect of the oxygen barrier. When two superimposed EVOH layers are used, one such interface is formed in the structure; with three EVOH layers being located immediately against each other, there are two interfaces in the sandwich structure, etc. The said EVOH layers of such a structure adhere to each other and to the base layer made of cardboard without an added tie layer, resulting in a thinner overall structure as well. Instead, between the oxygen barrier layer and a possible polyethylene layer working as the innermost moisture barrier, a tie layer is needed to ensure sufficient adherence.

Characteristic ti the fibre-based heat-sealable packaging material according to the invention is that, to provide the oxygen barrier, the packaging material includes at least two layers of ethylene vinyl alcohol copolymer (EVOH) with different fractions of ethylene monomer. A particularly advantageous effect is provided, when the said EVOH layers are superimposed, i.e., they adhere to each other directly, forming an interface or interfaces. In other words, the EVOH layers are placed against each other without an adhesive or other layer between them. Without being committed to a theory, a discontinuity, a differentiation in crystallinity or orientation is believed to form on the interface of the EVOH layers with different barrier properties, having an advantageous effect on the prevention of oxygen permeability.

The sealed package according to the invention, which is formed from such packaging material, is characterized in comprising a base layer of fibrous material, at least two layers of ethylene vinyl alcohol copolymer (EVOH) with different shares of ethylene monomer at least inside the same, and an innermost polymeric heat-sealable layer. When needed, the sandwich structure may also comprise other layers.

If the oxygen barrier is formed from exactly two EVOH layers with different fractions of ethylene monomer, they can be placed in the structure so that the EVOH layer with the higher fraction of ethylene monomer is located closer to the base layer, protecting the EVOH layer with the better oxygen barrier against wetting. Such a structure is preferable when packing products that must be stored dry and protected against gases, e.g., dry food products, especially if the humidity outside the package is high. According to another embodiment, the EVOH layer with the lower fraction of ethylene monomer is located closer to the base layer. Such a structure is preferable in liquid packages, wherein the moisture adverse to the gas barrier penetrates the material from inside the package.

According to an embodiment, the oxygen barrier includes three EVOH layers so that the EVOH layer with the lower fraction of ethylene monomer is located between the EVOH layers having higher fractions of ethylene monomer. In the said layers with the higher fraction of ethylene monomer, the fractions of ethylene monomer can be the same or different from each other. Another alternative is to arrange three different EVOH layers so that the EVOH layer closest to the base layer has the highest fraction of ethylene monomer, the next one has a lower fraction of ethylene monomer, and the one farthest from the base layer has the lowest fraction of ethylene monomer with respect to each other. When the application so requires, the layers can be in a reverse order to each other.

In the packaging material according to the invention, the EVOH layer with the lower fraction of ethylene monomer comprises 32 mol % of ethylene monomer at the most. Typically, the EVOH layer with the lower fraction of ethylene monomer comprises 27 to 32 mol % of ethylene monomer, but in the case of the layers opposite to each other, ethylene monomer of as low as 20 to 27 mol % can be used.

In the packaging material according to the invention, the EVOH layer with the higher fraction of ethylene monomer comprises at least 32 mol % of ethylene monomer. Such a layer usually comprises 35 to 48 mol % of ethylene monomer. 44 mol % is a much used fraction of ethylene monomer, but a fraction of 48 mol % is also well-known in the field.

In the sandwich structure according to the invention, the EVOH combination layer like the one described above is located between the base layer and the inner heat-sealable layer so that it is not in contact with the packaged product.

In the packaging material according to the invention, the coating can be omitted from one side of the base layer, i.e., the fibre base, when so desired. However, the fibre base is preferably provided with a polymeric heat-sealable layer on both sides thereof but, certainly, other functional layers can lie between or on top of them. In that case, the same polymer is preferably used in all the heat-sealable layers. The base layer that is used in the packaging material is typically a layer made of fibrous material, i.e., paper or board, adding to the finished package the necessary properties, such as stiffness, strength and firmness. Depending on the requirements of the use, the material can be bleached or unbleached board, e.g., packaging board with a weight of 130 to 500 g/m$^2$, preferably 170 to 300 g/m$^2$ or, alternatively, paper with a weight of 20 to 120 g/m$^2$.

When manufacturing the sandwich structure, the layers can be added to the structure one by one, or by first combining certain layers together and joining them to the coated or uncoated base layer. There are numerous different combinations and those skilled in the art can deduce them on the basis of the properties of the layers that are combined.

A sealed package can be formed from the packaging material described above, comprising a layer of fibrous material, at least two layers of ethylene vinyl alcohol copolymer (EVOH) with different fractions of ethylene monomer inside the same, and an innermost polymeric heat-sealable layer. In addition to the inner surface, the polymeric heat-sealable layer can also be provided on the outer surface of the package moulded from the material according to the invention. By heat sealing the blank that is cut and shaped from the material described above, a package container or carton made of the polymer-coated packaging board is obtained. One preferred embodiment comprises a food package that is sealed in an oxygen-tight manner. The packaging material described above is preferable in liquid packages, in particular.

The liquid-tightness of the package is provided by a polyolefin, such as low density polyolefin (LDPE), which is used as a sufficiently thick heat-sealable layer. The oxygen, fat, and aroma tightness of the packaging material can further be influenced by placing one or more polymeric barrier layers between the fibre base and the heat-sealable layer, their material being, e.g., polyamide (PA), polyethylene terephthalate (PET) or a mixture thereof.

Another aspect of the invention comprises the use of two different ethylene vinyl alcohol copolymers (EVOH) with different fractions of ethylene monomer in the fibre-based packaging material as polymer layers forming the oxygen barrier. The use is particularly advantageous in a package made of polymer-coated packaging board, which is exposed to moisture both on the inside and/or the outside.

In the following, the packaging materials according to the invention are described in detail by means of examples and with reference to the appended drawings.

BRIEF DESCRIPTION OF THE DRAWINGS

FIG. 1 shows an example of a liquid package manufactured from the material according to the invention. The enlargement of the figure illustrates, what is referred to as the inside and the outside of the package and how the layers are located with respect to the same to provide the package with functionally advantageous properties. In the manufacture of such a package, it is preferable to use liquid packaging board provided with a heat-sealable layer on both sides thereof.

FIG. 2 shows a packaging board according to the invention, which is provided with an oxygen barrier and a polymer coating that is heat sealed on both sides thereof. The structure is otherwise similar to that of patent EP 0630745, but instead of the one EVOH layer described therein, the oxygen barrier layer in the structure according to the invention is divided, i.e., it includes two EVOH layers. Starting from the outside of the package, the figure shows, first, a heat-sealable layer 12 directly combined with a base layer 11. The heat-sealable layer 12 consists of heat-sealable polyolefin and the base layer consists of paper or board. On the other side thereof, i.e., on the inside of the package, there are oxygen barrier layers 1b and 1a. In the figures, 1a represents EVOH with a higher ethylene content, 1b EVOH with a lower ethylene content than 1a, and 1c EVOH with the lowest ethylene content. These contents are in proportion to each other and do not necessarily depend on the oxygen barrier properties described elsewhere. On the inner side of the oxygen barrier layer 1a, there is a tie layer 13 that ties the heat-scalable layer 12 to the structure. Typically, the heat-sealable layers also have moisture barrier properties. If no heat-sealable layer is to be provided on the outer surface of the package, a structure according to FIG. 6 is provided, wherein the base layer 11 constitutes the outermost layer of the package.

In FIG. 2, the heat-sealable layers 12 are preferably selected so that they are sealable not only to themselves but also to each other. This is simply implemented so that they consist of the same heat-sealable polymer, e.g., polyolefin. Typical heat-scalable polyolefins include polypropylene (PP) and low density polyethylene (LD-PD). They can also be different polymers so that the sealing layer on the outside comprises low density polyethylene and the heat-sealable layer on the inside comprises linear low density polyethylene (LLD-PE), for example. The strengths of the heat-sealable layers can be, e.g., less than 20 g/m$^2$ for dry packages, and over 20 g/m$^2$ for liquid packaging materials. For example, the tie layer 13 can consist of acid-treated linear low density polyethylene with a strength of 1 to 6 g/m$^2$. The weight of the board of the base layer is at least about 170 g/m$^2$ and, generally, in the order of 225 g/m$^2$ or higher. If paper is used as the base structure, its weight is less than 170 g/m$^2$. The total thickness of the oxygen barrier layers may vary from 2 to 20 g/m$^2$ so that the layers can either be of the same thickness or a different thickness. The most conventional thicknesses of a single EVOH layer range from 3 to 10 g/m$^2$. The idea in this example is that the fractions of ethylene monomer be, e.g., 44 mol % for 1a, and 32 mol % for 1b. Other feasible combinations are shown in Table 1. The processability of the material becomes more difficult, but the gas barrier properties improve, when moving towards lower fractions of ethylene monomer.

TABLE 1

Various combinations of EVOH layers.

| Layer | Fraction of ethylene monomer in EVOH, mol % | | | | | | | | | | | | | | | |
|---|---|---|---|---|---|---|---|---|---|---|---|---|---|---|---|---|
| 1a | 48 | 48 | 44 | 44 | 44 | 44 | 38 | 38 | 38 | 38 | 35 | 35 | 35 | 32 | 32 | 32 |
| 1b | 44 | 32 | 32 | 29 | 27 | 26 | 32 | 29 | 27 | 26 | 29 | 27 | 26 | 29 | 27 | 26 |

Within the invention, it is to be understood that the barrier layer structure formed by 1a and 1b can also be divided into four parts so that two EVOHs with different fractions of ethylene monomer are used. In other words, the structure can be described so that each EVOH layer is divided into two and the layers are extruded in an overlapping manner. This can very well be implemented by the present coextrusion devices. One part of each grade remains surrounded by the second grade on both sides thereof, and one part of the first grade is in contact with the base layer on one side thereof and with the second EVOH grade on the other side, and one layer of the second grade is in contact with the first grade and the tie layer.

This structure can also be described as follows:

HS/PB/EVOH1/EVOH2/EVOH1/EVOH2/tie/HS, wherein HS (heat-sealable) refers to the heat-sealable layer, PB (paper, board) to the base layer and tie to the binder. The abbreviations EVOH1 and EVOH2 refer to two freely selected ethylene vinyl copolymers, their ethylene monomer contents being different from each other, for example, in the combinations according to Table 1.

In that case, the barrier layer structure is divided into four parts so that two different EVOHs are used. In other words, the structure can be described so that each EVOH grade is divided into two and the layers are extruded in an overlapping manner. One layer of each grade remains surrounded by the second grade on both sides thereof, and one layer of the first grade is in contact with the base layer on one side and with the second EVOH grade on the other side thereof, and one layer of the second grade is in contact with the first grade and the tie layer.

Figure 1:
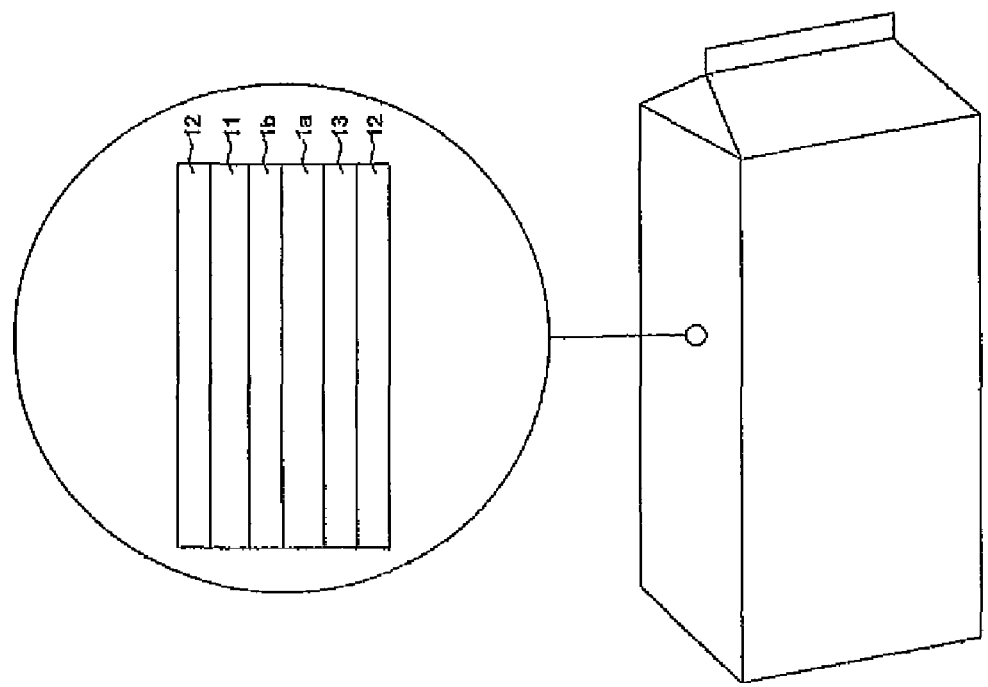
FIG. 1 is a simplified illustration of a possible package that is moulded from a packaging material blank of the invention.
Figure 2:
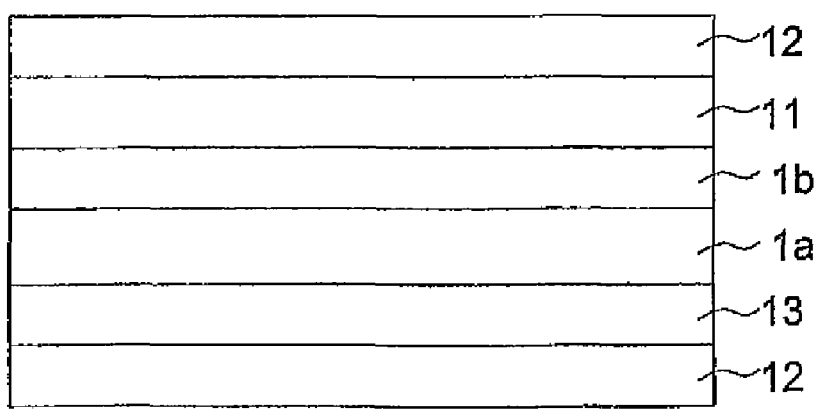
FIG. 2 is a schematic cross-sectional view of a polymer-coated packaging board according to one embodiment of the invention.
Figure 3:
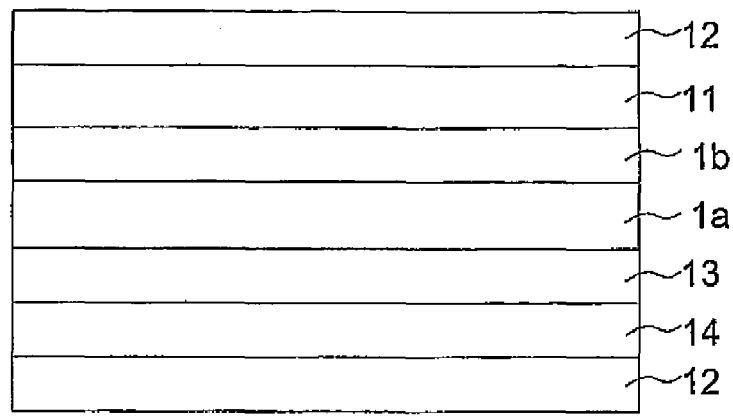
FIG. 3 is a schematic cross-sectional view of a polymer-coated packaging board according to another embodiment of the invention.

Compared with FIG. 2, FIG. 3 shows otherwise the same layers but the heat-sealable layer inside the package is divided into a transparent layer 12 and a pigmented layer 14. Alternatively, it could be conceived that, between the heat-sealable layer and the tie layer, a pigmented layer made of the same polymer (typically PE) as the material of the heat-sealable layer is added, which layer can also contribute to the formation of the seam. Such a structure is described in detail in patent application WO2004007195. Depending on the use, the said pigmented layer 14 can contain a black pigment only, or a black (e.g., carbon black) and a white (e.g., titanium oxide) pigment, mixed in a suitable proportion, whereby the inner surface of the finished product looks as if having a layer of aluminium foil. The light-shielding properties of such a layer are comparable to using a metal layer. When using such a structure in liquid packages, the EVOH layer with the higher ethylene monomer content is closer to the inner side of the package in relation to that with the lower ethylene monomer content. The structure according to FIG. 3 can also be implemented without the outermost heat-sealable layer so that the base layer 11 consisting of board is the outermost layer of the structure.

Figure 4:
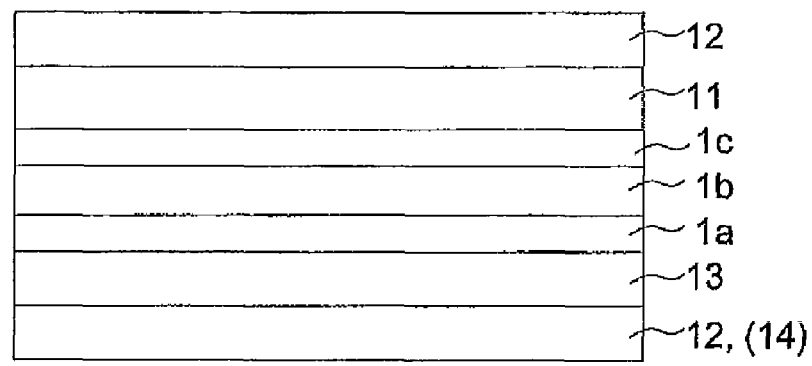
FIG. 4 is a schematic cross-sectional view of a polymer-coated packaging board according to yet another embodiment of the invention.

FIG. 4 shows a structure that otherwise corresponds to the sandwich structure of FIG. 2, except that the oxygen barrier layer of ethylene vinyl alcohol copolymer consists of a film comprising three EVOHs with different ethylene monomer mole fractions, or it could be conceived that the oxygen barrier layer is divided into three parts, each of which thus comprising a different EVOH. In that case, the EVOH with the highest ethylene monomer content is the innermost in the packaging material, the ethylene monomer content in the EVOH decreasing therefrom so that the EVOH with the lowest ethylene monomer content is the closest to the outer surface.

Figure 5:
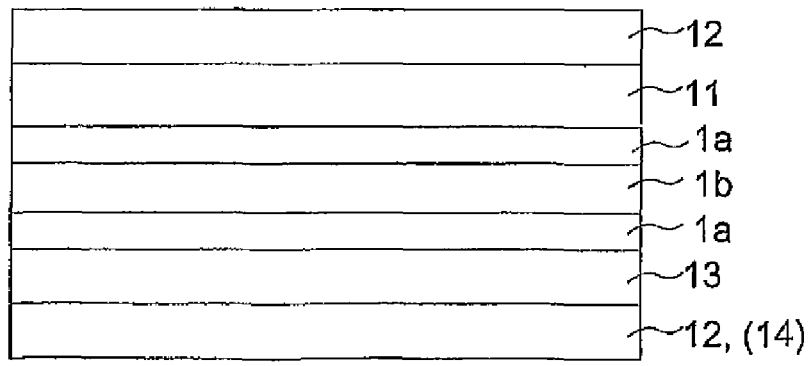
FIG. 5 is a schematic cross-sectional view of a polymer-coated packaging board according to yet another embodiment of the invention.
Figure 6:
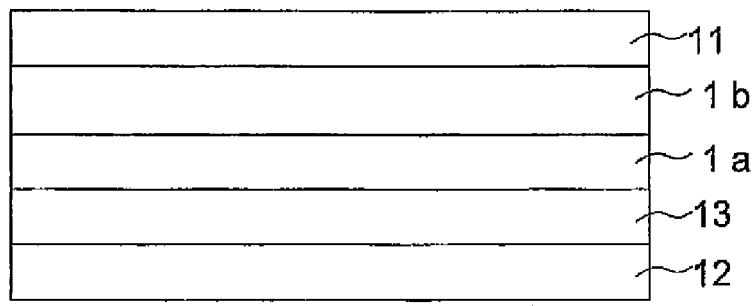
FIG. 6 is a schematic cross-sectional view of a polymer-coated packaging board according to yet another embodiment of the invention.

FIG. 5 correspondingly shows three immediately adjacent EVOH layers, but the EVOH with the lower ethylene monomer content in this structure is between the two EVOH layers with the higher ethylene monomer contents. Naturally, several combinations are provided by combining the different EVOH contents in the structures according to FIG. 4 or 5. In FIGS. 4 and 5, the innermost heat-sealable layer 12 is marked with a footnote (14), implying that the three-layer EVOH can also be applied to applications containing pigmented polymers.

Figure 7:
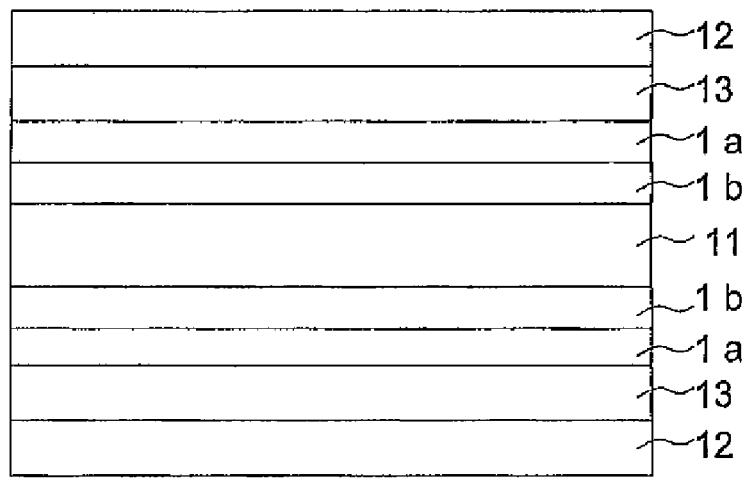
FIG. 7 is a schematic cross-sectional view of a polymer-coated packaging board according to yet another embodiment of the invention.

An additional feature in the structure of FIG. 7 is the symmetry, which is an advantage when forming the coating layers by coextrusion. It comprises, on both sides of the substrate or the base layer 11 made of board, first, EVOH layers 1b with good oxygen barrier properties and a lower ethylene monomer content and, next, EVOH layers 1a with a higher ethylene monomer content, which are tied to the heat-sealable layers 12 by tie layers 13.

Figure 8:
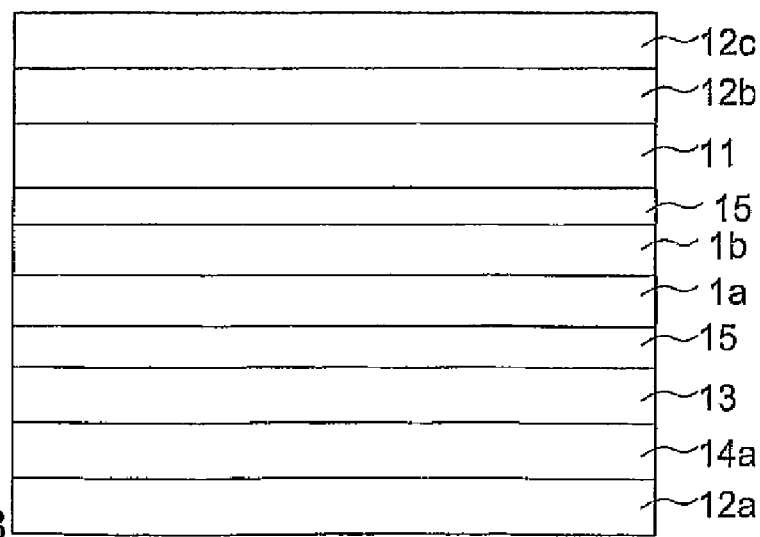
FIG. 8 is a schematic cross-sectional view of a polymer-coated packaging board according to yet another embodiment of the invention.

FIG. 8 shows a special packaging board, which is suitable for food packages that are processed in an autoclave, in particular, the material comprising transparent heat-sealable layers 12a, 12c of polypropylene that lie on the outer surface of the package, polyamide layers 15 inside the fibre base 11, EVOH oxygen barrier layers 1a, 1b, and the tie layer 13, which adheres the oxygen barrier surrounded by polyamide to the pigment layer 14a, its material being, e.g., a polymer by the name of Admer, marketed by Mitsui Chemicals. The package formed from the material is thus protected against the yellowing of the fibre base 11 in the autoclave by the pigmented layers, of which 12b is polypropylene provided with a white pigment, and 14a is polypropylene pigmented black; and the oxygen protection layers 15, 1a, 1b and the light-shielding layer 14a inside the package protect the packaged product, lengthening its preservability and useful selling period. Within the invention, the layers 12b and/or 14a may optionally contain a white or black pigment or a mixture thereof, producing a grey layer with a layer strength of 5 to 50 g/m$^2$. As the layers 14a and 12b can be seamed together, the transparent heat-sealable layers 12a and 12c can optionally be omitted from such a structure. The material can be folded and heat sealed into a sealed package so that the superimposed, pigmented polymer layers 12c and 12b lie on the outer surface of the package, i.e., outside the fibre base 11, and the grey light-shielding layer 14a and the transparent heat-sealable layer 12a on the inner surface of the package, i.e., inside the fibre base 11, the oxygen barrier layers 1b, 1a, and the tie layer 13. The external superimposed pigmented layers 12c, 12b of the package give the package a light, almost white tint, which will not change when the package is heat-treated in the autoclave, for example.

The structure according to FIG. 8 can also be implemented without the polyamide layers 15. Another alternative way of implementing the structure in FIG. 8 is to use, as the heat-sealable layers 12c and 12b, polypropylene that is pigmented white and black, respectively.

In the packaging materials according to FIG. 8, the fibre base 11 can consist of packaging board containing bleached sulphate pulp, its weight being 130 to 500 g/m$^2$, preferably 170 to 300 g/m$^2$. If the fibre base alternatively consists of bleached paper, its weight can be 20 to 120 g/m$^2$. The weight of each polyamide (PA) or EVOH oxygen barrier layer 15, 1a, 1b can be 3 to 15 g/m$^2$, preferably 5 to 10 g/m$^2$, and more preferably 3 to 8 g/m$^2$. The weight of the transparent heat-sealable layers 12a, 12c can be 5 to 30 g/m$^2$, preferably 7 to 20 g/m$^2$. The weight of the external pigmented layer 12b of the fibre base 11 can be 20 to 50 g/m$^2$ and that of the other pigment-containing layer 14a 5 to 10 g/m$^2$. The weight of the internal light-shielding layer 14a of the fibre base 11, which is pigmented grey, can be 5 to 50 g/m$^2$, preferably 25 to 40 g/m$^2$. The content of titanium dioxide in the coating layer 12b dyed white can be 5 to 25%, preferably 7 to 12%. The content of carbon black in the inner coating layer 3 can be 0.05 to 0.5%, preferably 0.06 to 0.15%. If the layer 14a also comprises titanium dioxide, its content can be 5 to 25%, preferably 7 to 15%. The content of carbon black in the light-shielding layer 14a pigmented grey can be 0.05 to 0.5%, preferably 0.12 to 0.15%, and the content of titanium dioxide, correspondingly, 5 to 25%, preferably 7 to 12%. The weight of the Admer tie layers 13 can be 3 to 15 g/m$^2$, preferably 5 to 10 g/m$^2$.

Figure 9:
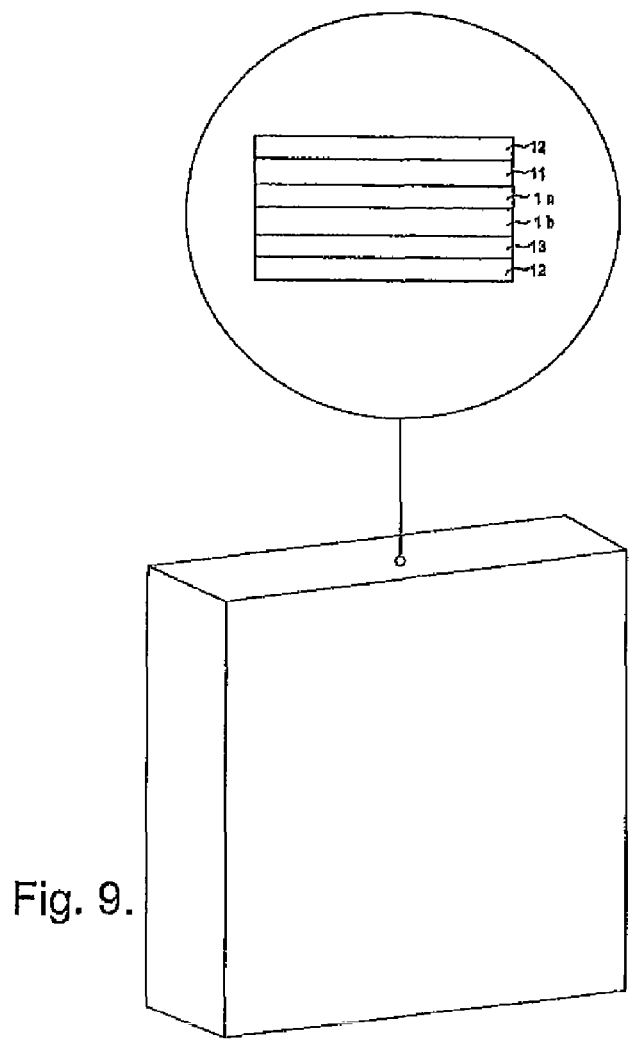
FIG. 9 is a simplified illustration of a possible package that is moulded from a packaging material blank of the invention.
Figure 10:
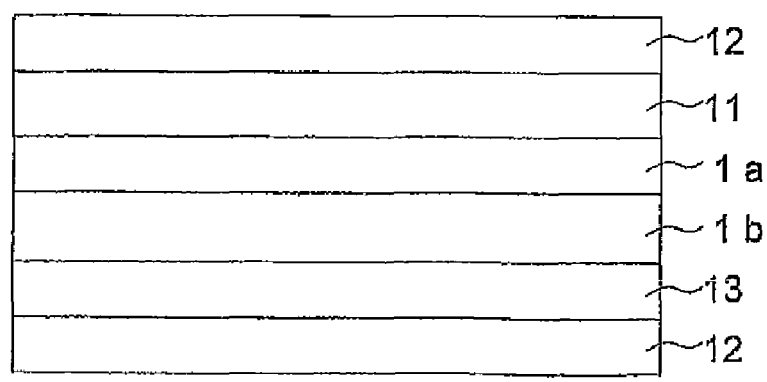
FIG. 10 is a schematic cross-sectional view of a polymer-coated packaging board according to yet another embodiment of the invention.

FIG. 9 shows a sealed package with the shape of a rectangular prism, which is manufactured by folding and heat sealing from a blank comprising the packaging material according to FIG. 10. The package is suitable to packing dry products and designed to protect the packaged product against moisture and gases coming from the outside. The divided EVOH layer has an essential role in this, whereby, contrary to the liquid packages, the EVOH layer 1a with a better moisture resistance is closer to the outer surface of the package in the structure, protecting the layer 1b with a higher oxygen barrier against wetting. The figure includes a partial enlargement of the package wall. It can be observed that, similarly to the previous structure examples, the heat-sealable polymer layer 12 lies inside the package, comprising the innermost layer of the package.

Figure 11:
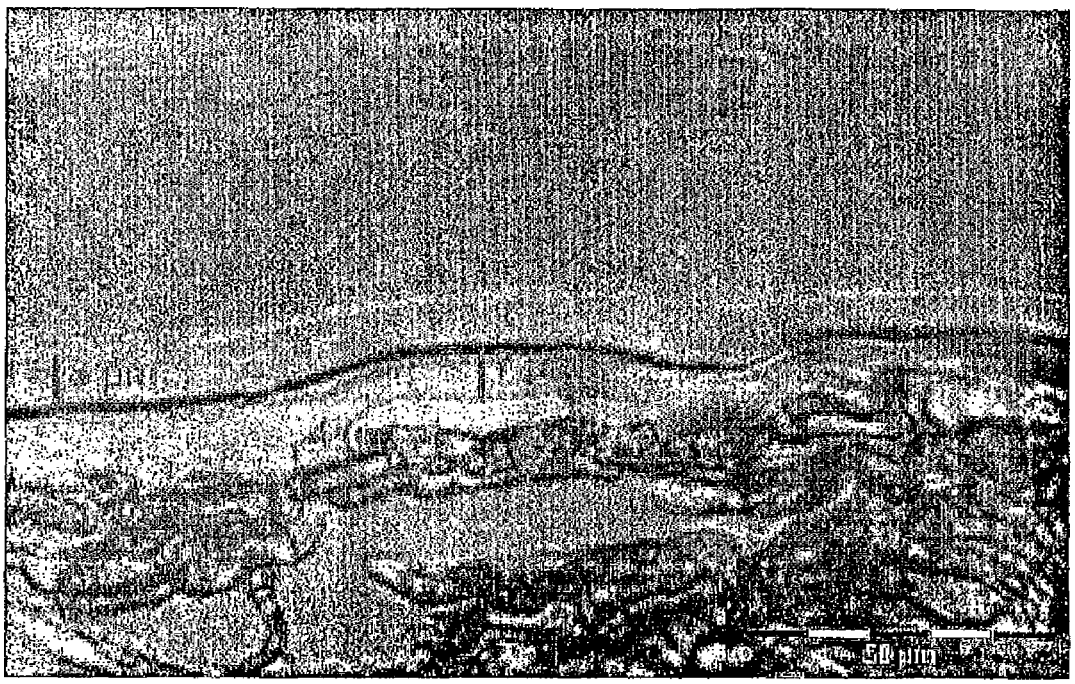
FIG. 11 presents a crosscut of the packaging material implemented according to the invention, showing its various layers.

FIG. 11 shows a crosscut of the packaging material implemented according to the invention, showing its various layers. The layers from below upwards comprise the fibre base 11, the EVOH oxygen barrier layer with a higher ethylene monomer content, here with a thickness of about 4 μm corresponding to a coating amount of about 4 g/m$^2$, the EVOH oxygen barrier layer with a lower ethylene monomer content, here with a thickness of about 7 μm corresponding to a coating amount of about 7 g/m$^2$, the tie layer, here with a thickness of about 8 μm corresponding to a coating amount of about 8 g/m$^2$ and, on top of that, the heat-scalable layer, here with a thickness of about 40 μm corresponding to a coating amount of about 40 g/m$^2$.

EXAMPLES

A film with oxygen permeability of 10 cm$^3$/m2/day or less is classified as a material with a higher oxygen barrier.

The Ensobarr product used in the tests is in accordance with that described in patent EP0630745 B1 and it is commercially available from Stora Enso Oyj. The samples in Examples 1 and 2 were Ensobarr cardboard samples, wherein the layers providing the oxygen barrier are as follows: Sample 1 representing the prior art, 32 mol % EVOH, layer thickness 6 μm; Sample 2 representing the prior art, 32 mol % EVOH, layer thickness 10 μm; and Sample 3 according to the invention, two EVOHs with different ethylene monomer contents, the total layer thickness being 11 μmm, divided into a 7 μm EVOH layer with a 44 mol % ethylene monomer content and a 4 μm EVOH layer with a 32 mol % ethylene monomer content.

The samples were stored at different temperatures and different relative humidity values. The conditions were as follows:

| No. of example | Temperature | Relative humidity | Place of storage |
|---|---|---|---|
| 1 | 23° C. | 50% | Condition cabinet |
| 1 | 23° C. | 69% | Exsiccator containing saturated KI solution |
| 1.2 | 23° C. | 85% | Exsiccator containing saturated KCl solution |
| 3 | 38° C. | 90% | Condition cabinet |

Example 1

Oxygen Permeability of Packaging Material at a Relative Humidity of 69%

In the test, the samples of packaging material were stored at different relative humidity conditions to assess the effect of air humidity on the oxygen transmission rates ($O_2TR$). The samples comprised Ensobarr cardboard samples with different layer thicknesses of 32 mol % EVOH, and 32 mol % and 44 mol % EVOH in different layers, corresponding to the structure of FIGS. 10 and 11. Ensobarr is a commercial packaging material with the following sandwich structure: PE/board/EVOH/tie/PE, wherein PE is polyethylene, board the base layer and tie the binder layer. The basis weights, EVOH layer thicknesses, ethylene monomer contents and oxygen permeability of the samples at the beginning (at a temperature of 23° C. and relative humidity of 50%) are shown in Table 1.

TABLE 1

Basis weights, sample thicknesses, and oxygen permeability at the beginning of the test.

| Sample | Ensobarr grade g/m² | EVOH layer thickness | $O_2TR$, 23° C. and 50% relative humidity, cm³/m²/day |
|---|---|---|---|
| 1. 32 mol % EVOH | 56 | 6 | 4.7 |
| 2. 32 mol % EVOH | 57 | 10 | 1.6 |
| 3. 44 mol % and 32 mol % EVOH | 59 | 11 | 1.2 |

At first, the oxygen permeability was inverse to the thickness of the EVOH layer. The samples were stored at an increased relative humidity, i.e., 69% instead of the initial value of 50%. During the first week, the oxygen permeability increased slightly. After 8 weeks of storage, the results showed no significant differences compared with the storage of 1 week. The results are compiled in Table 2.

TABLE 2

Storage test, oxygen permeability, 69% relative humidity, 8 weeks.

| Sample | $O_2TR$, 23° C. and 50% relative humidity, cm³/m²/day | $O_2TR$, 23° C. and 69% relative humidity, cm³/m²/day | |
|---|---|---|---|
| | | After 1 week | After 8 weeks |
| 1. 32 mol % EVOH | 4.7 | 5.4 | 5.7 |
| 2. 32 mol % EVOH | 1.6 | 3.0 | 3.2 |
| 3. 44 mol % and 32 mol % EVOH | 1.2 | 2.1 | 2.4 |

Example 2

Oxygen Permeability at a Relative Humidity of 85%

Measurements corresponding to the tests of Example 1 were carried out at a temperature of 23° C. and a relative humidity of 85%. In these conditions, in Sample 1 with the thinnest 32 mol % EVOH layer, this value was exceeded already after a couple of weeks of storage. The sample containing the same polymer as a thicker layer maintained the oxygen permeability below this limit value for four weeks of storage, but the value was exceeded after eight weeks of storage. Instead, Sample 3 according to the invention maintained its grading as a material of high oxygen barrier for storage of 4 to 7 weeks. The results are shown in Table 3.

TABLE 3

Storage test, oxygen permeability, 85% relative humidity, 8 weeks.

| Sample | $O_2TR$, 23° C. and 50% relative humidity, cm³/m²/day | $O_2TR$, 23° C. and 85% relative humidity, cm³/m²/day | | |
|---|---|---|---|---|
| | | After 1 week | After 4 weeks | After 8 weeks |
| 1. 32 mol % EVOH | 4.7 | 9.1 | 14 | 24 |
| 2. 32 mol % EVOH | 1.6 | 8.1 | 10 | 17 |
| 3. 44 mol % and 32 mol % EVOH | 1.2 | 5.6 | 7.3 | 12 |

Example 3

Oxygen Permeability at a Relative Humidity of 90%

To assess the durability of the packaging material in tropical conditions, the relative humidity was increased to 90% and the temperature was raised to 38° C. In such conditions, all samples lost their properties after a week of storage. The oxygen permeability of the sample according to the invention was half of that of the samples according to the prior art, but even it fell short of the target value by less than 10 cm³/m²/day. Since the detection accuracy of the device was exceeded, these results are not shown.

In all tests, the oxygen permeability properties of the sample according to the invention (Sample 3) were better than those of the samples according to the prior art (Samples 1 and 2). In the measurement of initial values in the conditions of 23° C. and 50% relative humidity, wherein the wetting of the material should not impede the oxygen barrier properties, Sample 3 with merely the 4 μm layer of 32 mol % EVOH exhibited lower permeability values than Sample 2 with the 10 μm layer of 32 mol % EVOH. This indicates the better oxygen barrier property of the combined 44 mol % and 32 mol % EVOH layer, wherein the interface might have a role. When storing at higher moisture contents, the moisture proofing effect of also the 44 mol % EVOH layer was obvious; in addition, the protective effect of the interface might also be advantageous herein.

Example 4

Cross Section of the Sandwich Structure of a Packaging Material According to the Invention The packaging material according to the invention was manufactured by sandwiching a board and polymeric layers on top of that by coextrusion. The structure is shown in FIG. 11, wherein a crosscut transversal to the sandwich structure shows the layer arrangement according to an embodiment and the thickness of some layers. The structure of the crosscut is similar to the one presented schematically in FIG. 10, except that the outermost heat-sealable layer 12 is not tied to the base layer 11. The layer arrangement and the layer thicknesses measured from the structure are as follows: board (not specified), EVOH 44% (4 μm), EVOH 32% (7 μM), binder (4 μm), polyethylene (about 40 μm). The interface between the two EVOH layers that has an advantageous effect on the gas barrier properties is also visible in the figure.

The figure shows that the thickness of the layer against the fibre structure varies considerably. Due to the way of making the crosscut, the thickness variation of the layers and their orientation towards each other is apparently higher than in reality.

It is obvious to those skilled in the art that the various embodiments of the invention are not limited to the examples shown above but can vary within the following claims. The focus of the invention is to divide the oxygen barrier layer into EVOH layers with two or more different ethylene monomer contents. Such a layer can be used in replacing the conventional EVOH layer in a structure that has conventionally used an EVOH gas barrier layer. Numerous combinations are provided by the various fractions of monomers, those skilled in the art being capable of combining them on the basis of the above.

THE REFERENCE NUMBERS USED IN THE FIGURES

| | |
|---|---|
| 1a | EVOH layer with a higher ethylene monomer content |
| 1b | EVOH layer with a lower ethylene monomer content |
| 1c | EVOH layer with an especially low ethylene monomer content |
| 11 | Base layer, fibrous, generally made of board |
| 12 | Heat-sealable layer |
| 12a | The innermost heat-sealable layer of the package, made of polypropylene (PP) |
| 12b | Pigmented heat-sealable layer made of polypropylene (PP) |
| 12c | The outermost heat-sealable layer of the package, made of polypropylene (PP) |
| 13 | Tie layer |
| 14 | Heat-sealable layer with pigment |
| 14a | Pigmented black or grey heat-sealable layer of polypropylene (PP) |
| 15 | Polyamide layer (PA) |

The invention claimed is:

1. Polymer-coated heat-sealable packaging material comprising a base layer of fibre material, at least two polymeric layers that form an oxygen barrier, said at least two polymeric layers being located immediately against one another without a tie layer between them, and at least one polymeric heat-sealable layer,
wherein said at least two polymeric oxygen barrier layers comprise ethylene vinyl alcohol copolymer (EVOH) having different ethylene monomer contents, a first polymeric oxygen barrier layer having a higher ethylene monomer content and being closer to the base layer than a second oxygen barrier layer having a lower ethylene monomer content.

2. Packaging material claim 1, characterized in that the EVOH layer with a lower fraction of ethylene monomer comprises 32 mol % of ethylene monomer at the most.

3. Packaging material according to claim 1, characterized in being provided, on at least one side thereof, with an outermost polymeric heat-sealable layer.

4. Packaging material claim 1, characterized in that the EVOH layer with a higher fraction of ethylene monomer comprises at least 32 mol % of ethylene monomer.

5. Packaging material according to claim 4, characterized in that the EVOH layer with the higher fraction of ethylene monomer comprises 35 to 48 mol % of ethylene monomer.

6. A sealed package that is formed from the packaging material claim 1, characterized in comprising a layer of fibrous material, at least two layers of ethylene vinyl alcohol copolymer (EVOH) with different fractions of ethylene monomer inside the same, and an innermost polymeric heat-sealable layer.

7. A package according to claim 6, characterized in being provided, on at least one side thereof, with an outermost polymeric heat-sealable layer.

8. A package according to claim 6, characterized in being a food package that is sealed in an oxygen-tight manner.

9. Packaging material according to claim 1 or 3, characterized in being provided, on both sides thereof, with an outermost polymeric heat-sealable layer.

10. A package according to claim 6 or 7, characterized in being a package container or carton made of polymer-coated packaging board.

11. Polymer-coated heat-sealable packaging material comprising a base layer of fibre material, at least two polymeric layers that form an oxygen barrier, said at least two polymeric layers being located immediately against one another without a tie layer between them, and at least one polymeric heat-sealable layer,
wherein said at least two polymeric oxygen barrier layers comprise ethylene vinyl alcohol copolymer (EVOH) having different ethylene monomer contents, a first polymeric oxygen barrier layer having a lower ethylene monomer content and being closer to the base layer than a second oxygen barrier layer having a higher ethylene monomer content.

* * * * *